United States Patent [19]
Hironaka

[11] Patent Number: 5,063,890
[45] Date of Patent: Nov. 12, 1991

[54] 2-CYCLE INTERNAL COMBUSTION ENGINE

[75] Inventor: Yoshiaki Hironaka, Sayama, Japan

[73] Assignee: Kioritz Corporation, Tokyo, Japan

[21] Appl. No.: 532,151

[22] Filed: Jun. 1, 1990

Related U.S. Application Data

[63] Continuation of Ser. No. 266,484, Nov. 2, 1988, abandoned.

[30] Foreign Application Priority Data

Nov. 18, 1987 [JP] Japan .................... 62-175058[U]

[51] Int. Cl.⁵ .............................................. F02F 1/00
[52] U.S. Cl. ............................ 123/145 A; 123/294; 123/143 B
[58] Field of Search ............... 123/294, 143 A, 143 B, 123/254, 265, 145 A, 525, 526, 527, 27 GE, 73 A

[56] References Cited

U.S. PATENT DOCUMENTS

| | | | |
|---|---|---|---|
| 1,632,314 | 6/1927 | Rudqvist | 123/145 A |
| 3,402,704 | 11/1966 | Witzky et al. | 123/145 a |
| 3,425,399 | 2/1969 | Ward et al. | 123/27 GE |
| 4,140,090 | 2/1979 | Lindberg | 123/265 |
| 4,176,651 | 12/1979 | Backus | 123/27 GE |
| 4,317,432 | 3/1982 | Noguchi et al. | 123/143 B |
| 4,359,025 | 11/1982 | Zeliszkewycz | 123/294 |
| 4,369,746 | 1/1983 | Thring | 123/143 B |
| 4,462,346 | 7/1984 | Haman et al. | 123/73 A |
| 4,543,921 | 10/1985 | Torigai et al. | 123/145 A |
| 4,677,944 | 7/1987 | Nishimura et al. | 123/27 GE |
| 4,768,481 | 9/1988 | Wood | 123/254 |
| 4,856,484 | 8/1989 | Wilson et al. | 123/525 |
| 4,907,565 | 3/1990 | Bailey et al. | 123/27 GE |

Primary Examiner—Andrew M. Dolinar
Assistant Examiner—M. Macy
Attorney, Agent, or Firm—Browdy and Neimark

[57] ABSTRACT

A 2-cycle internal combustion engine, which operates with a gas fuel such as a liquefied gas, has a glow plug which is capable of igniting the air-fuel mixture introduced into the combustion chamber.

5 Claims, 2 Drawing Sheets

2-CYCLE INTERNAL COMBUSTION ENGINE

This application is a continuation of application Ser. No. 07/266,484, filed Nov. 2, 1988, now abandoned.

BACKGROUND OF THE INVENTION

The present invention relates to a 2-cycle internal combustion engine which operates with a liquefied gas fuel such as LPG, butane and so forth.

Known 2-cycle internal combustion engines which operate with a gas such as a liquefied gas incorporates, as is the case of engines which operates with gasoline, a sparking plug mounted on each cylinder to project into the combustion chamber and capable of igniting the gaseous fuel in the combustion chamber.

These known 2-cycle internal combustion engines which operate with a gas fuel suffers from a problem in that the weight is increased and the production cost is high due to the provision of a magneto provided in the ignition circuit.

SUMMARY OF THE INVENTION

Accordingly, an object of the present invention is to provide a 2-cycle internal combustion engine which operates with a gas fuel such as a liquefied gas, in which, by making a positive use of high ignitability of the gas fuel, the weight of the engine as well as the production cost is minimized, thereby overcoming the above-described problems of the prior art.

To this end, according to the present invention, there is provided a 2-cycle internal combustion engine capable of operating with a gas fuel such as a liquefied gas, comprising a glow plug capable of igniting the gas fuel in the combustion chamber.

In starting the engine, a coil on the glow plug is energized to glow the plug so as to facilitate the starting of the engine. Once the engine is started, the glow plug is maintained in red-heated condition by the heat generated as a result of combustion in the combustion chamber so that the gas fuel supplied into the combustion chamber is ignited, even when the supply of electrical power to the coil of the glow plug is terminated.

Thus, the consumption of the electrical power of the power supply is prevented because the electrical power is supplied only when the engine is started. In addition, the weight and the production cost can be advantageously reduced because the ignition system need not have any magneto.

DESCRIPTION OF THE PREFERRED EMBODIMENT

A preferred embodiment of the present invention will be described hereinunder with reference to the accompanying drawings.

Figure 1:
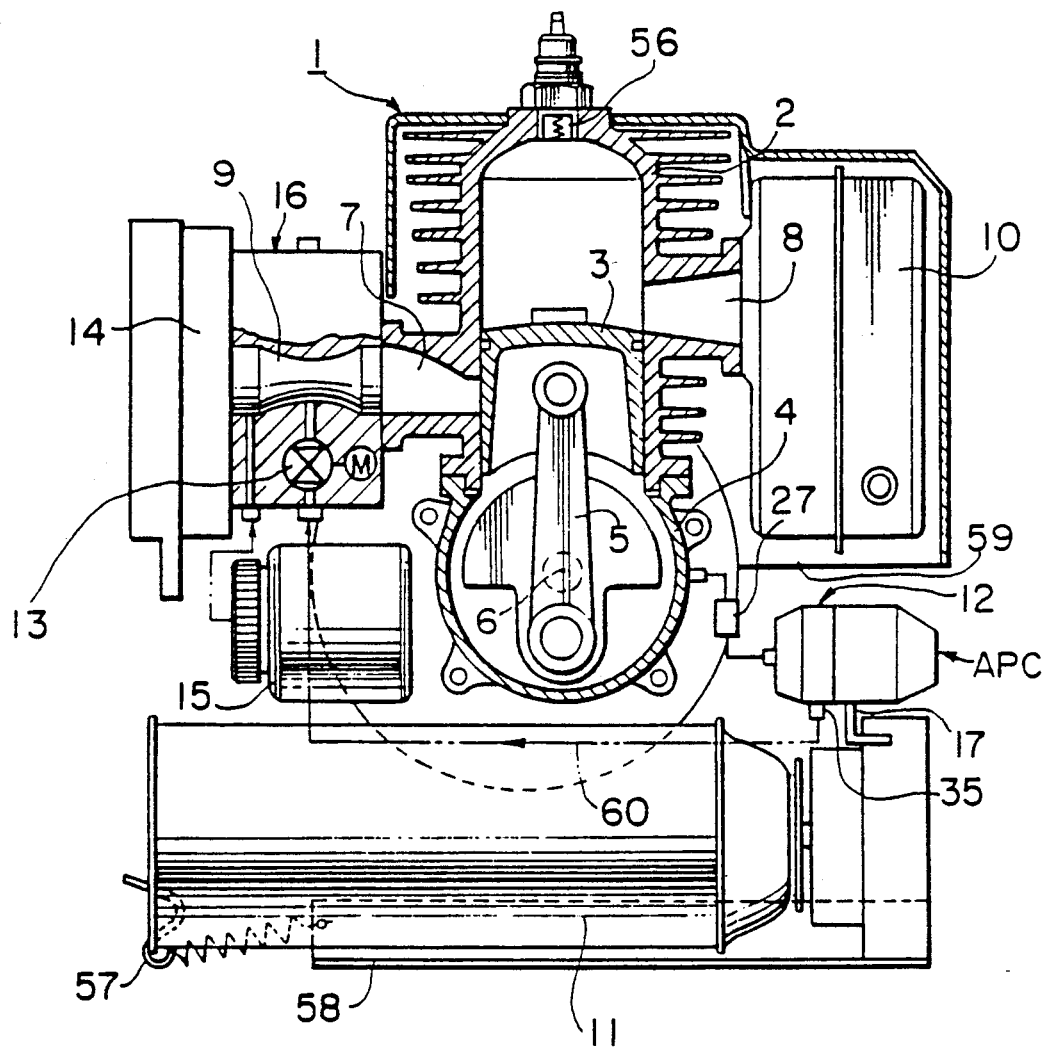
FIG. 1 is a schematic sectional view of an embodiment of 2-cycle internal combustion engine in accordance with the present invention.

Referring to FIG. 1, an internal combustion engine 1 embodying the present invention has a construction which is basically the same as known 2-cycle internal combustion engine. Namely, the engine has a cylinder 2, a piston 3 received in the cylinder 2, and a crankshaft 6 rotatably mounted in a crankcase 4 and connected to the piston 3 through a connecting rod 5. The cylinder 2 is provided on the side thereof with an intake port 7 and an exhaust port 8. The intake port 7 is communicated with a venturi tube 9 so as to be able to supply a mixture of air and fuel into the crank chamber in the crankcase 4 so as to be pre-compressed. The pre-compressed mixture is introduced into the combustion chamber formed in the cylinder 2 and is ignited to be burnt in the combustion chamber. The exhaust gas formed as a result of combustion is discharged outside the engine through a muffler 10. The internal combustion engine 1 operates with a suitable liquefied gas fuel such as LPG, butane or the like which is charged in an ordinary storage means such as a bomb or a cassette bomb. The gas bomb 11 is detachably mounted on a holder 58 at the bottom of the engine system, by means of a retaining tool 57.

The liquefied gas in the gas bomb 11 is jetted into the venturi tube 9 in a later-mentioned manner through an automatic pressure controller (APC), a gas leakage prevention device 12 and a manually-operable gas regulating cock 13. At the same time, air cleaned through an air cleaner 14 is inducted into the venturi tube 9 so that the air and the liquefied gas is mixed in the venturi tube 9. Furthermore, the venturi tube 9 is communicated with a lubricating oil supply system which includes, as will be explained later, a lubricating oil tank 15 and a lubricating oil pump 16. Lubricating oil stored in the lubricating oil tank 15 is forcibly supplied to the venturi tube 9 by means of the lubricating oil pump 16 so as to be atomized into the flow of the mixture of the liquefied gas fuel and the air. Thus, a mixture is formed which is composed of the liquefied gas, air and the lubricating oil, and the thus formed mixture is supplied into the cylinder 2 through the crank chamber in the crank case 4 of the internal combustion engine.

Figure 2:
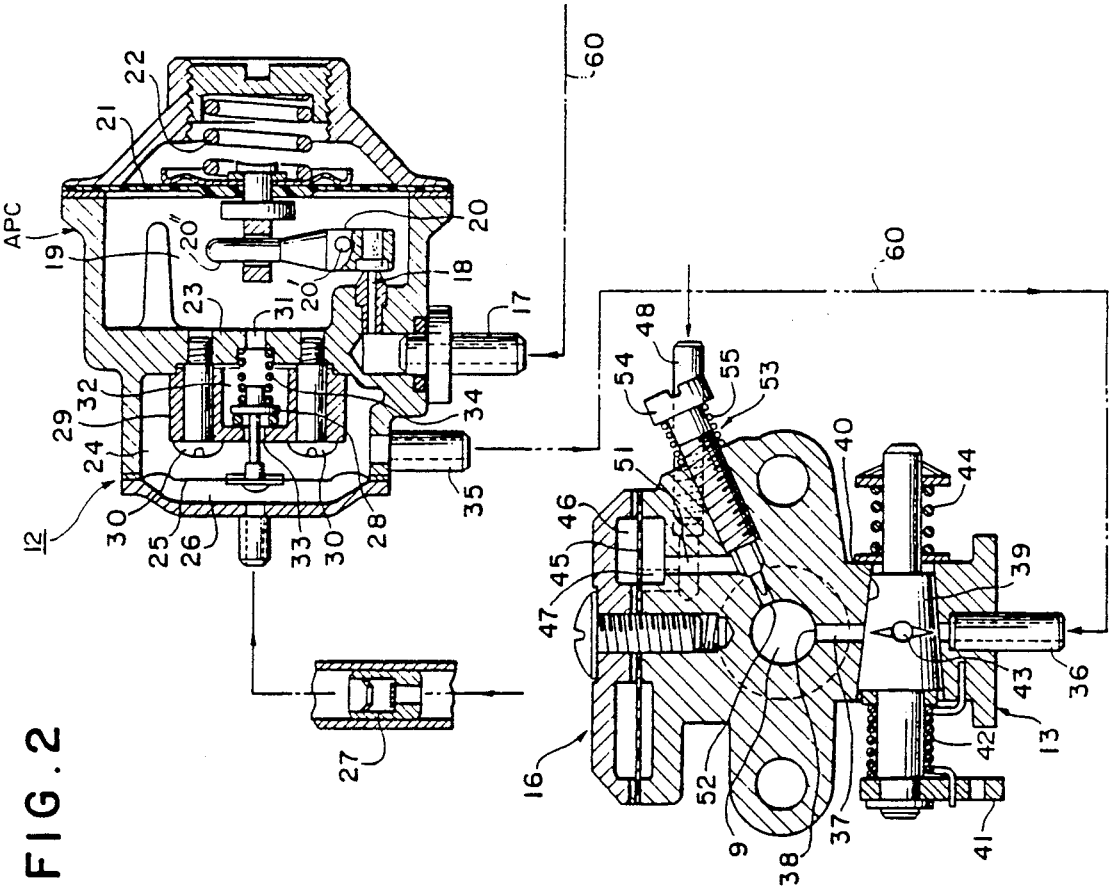
FIG. 2 is an enlarged fragmentary sectional view of portions of the embodiment shown in FIG. 1.

The gas bomb 11 is connected to gas inlet 17 of the automatic pressure controller (APC). The inlet 17 has an inner opening 18 which opens to a pressure regulating chamber 19 formed in the automatic pressure controller (APC). A valve 20, which is swingably carried by a shaft 20', is disposed in the pressure regulating chamber 19. The valve 20 is swingable so as to selectively open and close the inner opening 18 of the gas inlet 17. A free end 20" of the valve 20 is connected to a diaphragm 21 which divides the interior of the pressure regulating chamber 19 into two sections. Namely, the diaphragm 21 is deflected by a pressure regulating compression coiled spring 22 which is arranged to act on the side thereof opposite to the valve 20 so as to bias the valve 20 in such a direction as to open the inner opening 18 of the gas inlet 17. According to this arrangement, the liquefied gas charged in the gas bomb 11 is fed by its pressure into the chamber 19 through the gas inlet 17. This causes the internal pressure of the chamber 19 to rise, which in turn causes the pressure regulating diaphragm 21 to be deflected against the biasing force of the pressure regulating spring 22 so as to close the inner opening 18 of the gas inlet 17. In consequence, the gas pressure in the gas regulating chamber 19 is automatically maintained at a level at which the force generated by the gas pressure and acting on the pressure regulating diaphragm 21 and the force produced by the pressure regulating spring 22 balance each other. Thus, the valve 20 serves as a pressure regulating valve. The pressure regulating valve 20 is preferably set such that a pressure of about 200 to 500 mm Aq is maintained in the pressure regulating chamber 19. The automatic pressure controller APC and the gas leakage prevention device 12 are constructed in a unit as shown in FIG. 1 and FIG. 2. This unit structure is disposed in the vicinity of a cooling air outlet 59 beneath the muffler 10 so as to be maintained in adequate temperature by the air which flows from the cooling air outlet 59.

The gas leakage prevention device 12 has an automatic shut-off diaphragm 25 which is disposed in a first chamber section 24 which is separated from the pressure regulating chamber 19 by a partition wall 23. The diaphragm 25 defines at its side opposite to the first chamber section 24 a second chamber section 26. The second chamber section 26 is capable of receiving the pressure in the crankcase 4 of the internal combustion engine 1 through a check valve 27. A valve body 29 accommodating a reciprocating valve 28 is fixed to the partition wall 23 by means of screws 30. The valve body 29 has a valve chamber 32 communicating with the pressure regulating chamber 19 through an inlet port 31 formed in the partition wall 23, and an outlet port 33 through which the valve chamber 32 communicates with the first chamber section 24. The reciprocating valve 28 is connected to the automatic shut-off diaphragm 25 by a member which extends through the outlet port 33 formed in the valve body 29. In addition, the reciprocating valve 28 is urged in such a direction as to close the outlet port 33 of the valve body 29 by an automatic shut-off coil spring 34. The first chamber section 24 is connected through the gas outlet 35 of the gas leakage prevention device 12 to a gas inlet 36 of the manually operable gas regulating cock 13.

When the internal combustion engine 1 is not operating, the pressure substantially equal to the atmospheric pressure is maintained in the second chamber section 26 so that the reciprocating valve 28 tightly closes the outlet port 33 by the force produced by the automatic shut-off spring 34 and the force produced by the gas inside the pressure regulating chamber 19, thus preventing the gas from leaking from the valve chamber 32 into the first chamber section 24 and further to the gas regulating cock 13. As the engine is started, the mean pressure in the crank chamber of the crankcase 4 rises so that the pressure in the second chamber section 26 rises correspondingly. At the same time, the pressure in the venturi tube 9 is reduced to a level below the atmospheric pressure, i.e., a negative pressure is generated, so that a negative pressure also is produced in the first chamber section 24. In consequence, the automatic shut-off diaphragm 25 is deflected towards the first chamber section 24 so that the reciprocating valve 28 is moved against forces produced by the automatic shut-off spring 34 and the gas pressure so as to open the outlet port 33 of the valve body 29, whereby the liquefied gas is allowed to flow from the outlet port 33 into the first chamber section 24 and further to the gas regulating cock 13 past the gas outlet 35. Thus, the gas leakage prevention device 12 automatically shuts off the gas in the event of an unintentional stopping of the engine due to, for example, engine stall, thereby preventing accidental leakage of the gas.

An outlet 37 of the gas regulating cock 13 communicated with a gas jetting port 38 which opens to a lower portion of the venturi tube 9. The gas regulating cock 13 also has a valve member 39 which is rotatably and hermetically received in a tapered bore 40 such that one end of the valve member 39 projects from the large-diameter end of the tapered bore 40. A lever arm 41 is secured to the end of the valve member 39 projecting from the large-diameter end of the tapered bore 40. The lever arm 41 is operatively connected to a throttle lever (not shown) so as to be manually rotated by an operator. In addition, a torsion spring 42 is disposed to act between the main body of the cock 13 and the lever arm 41 so as to rotationally urge the valve member 39 to an angular position where a communication bore 43 formed in the valve member 39 is not aligned with the gas inlet 36 and the gas outlet 37, thus interrupting the communication between the gas inlet 36 and the outlet 37. A coil spring 44 is disposed such as to act on the other end of the valve member 39 which projects from the small-diameter end of the tapered bore 40, so as to prevent the valve member 39 from coming off the tapered bore 40, thereby keeping the hermetic contact between the valve member 39 and the tapered bore 40. The communication bore 43 formed in the valve member 39 is so shaped that its width progressively decreases in a circumferential direction so that the cross-sectional area of the gas passage provided by the communication bore 43 is progressively increased as the valve member 39 is rotated against the force of the torsion spring 42 so as to bring the communication bore 43 into communication with the gas inlet 36 and outlet 37, whereby the flow rate of the gas flowing through the cock 13 is directly regulated. The flow of the gas regulated by the cock 13 is jetted from the gas jet port 38 into the venturi tube 9 and is mixed into air which has been introduced through the air cleaner 14 into the venturi tube 9.

Thus, a gas passage 60, which is partially represented by a two-dot-and-dash line, leads from the gas bomb 11 to the venturi tube 9 and includes the automatic pressure controller (APC), gas leakage prevention device 12 and the gas regulating cock 13 which have described constructions and functions.

As explained in connection with FIG. 1, the lubricating system for supplying lubricating oil to the internal combustion engine 1 has the lubricating oil tank 15 for storing lubricating oil and a lubricating oil pump 16 connected to the lubricating oil tank 15 and capable of sucking lubricating oil from the lubricating oil tank 15.

Figure 3:
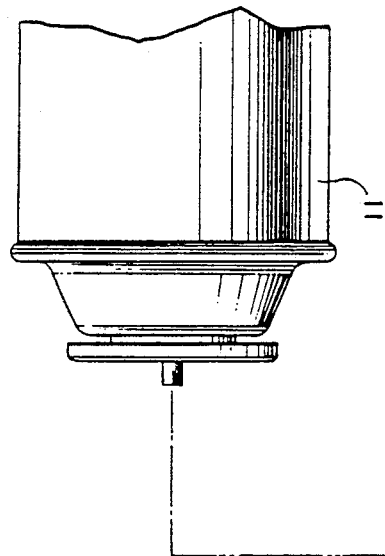
FIG. 3 is an enlarged sectional view of a portion of the embodiment shown in FIG. 1 taken along a plane perpendicular to that of FIG. 2.
Figure 3:
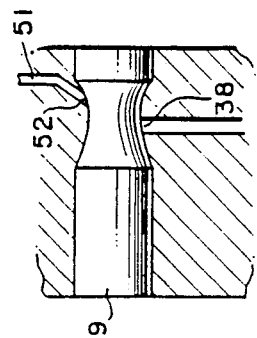

The detail of the lubricating oil pump 16 is shown in FIGS. 2 and 3. As will be seen from these Figures, the lubricating oil pump 16 is disposed in the vicinity of the venturi tube 9 and incorporates a pump diaphragm 45 on both sides of which are defined a pulsating pressure chamber 46 and a pump chamber 47. The pulsating pressure chamber 46 is connected to the crank chamber in the crankcase 4 of the internal combustion engine 1 so as to receive the pulsating pressure generated in the crank chamber. The lubricating oil pump 16 is connected at its inlet passage 48 to the lubricating oil tank 15. The inlet passage 48 leads to the pump chamber 7 through an inlet check valve which is not shown. The pump chamber 47 leads to a lubricating oil discharge port 52 through a check valve (not shown) and a discharge passage 51. The discharge port 52 opens into the venturi tube 9 at a portion downstream of the gas jetting port 38. The discharge passage 51 is provided with a lubricating oil regulating valve device 53 which includes a metering screw 54 screwed to a threaded hole in the side wall of the device 53. As the metering screw 54 is rotated, the end of the screw 54 is moved into and out of the discharge passage 51 so as to decrease and increase the cross-sectional area of the lubricating oil passage in the discharge passage 51. A compression coil spring 55 loaded between the head of the metering screw 54 and the wall of the device 53 absorbs any play in the screwing engagement between the metering screw 54 and the threaded hole, thereby enabling a stable and delicate control of the flow rate of the lubricating oil.

As will be seen from FIG. 2, the venturi tube 9, the gas regulating cock 13 and the lubricating oil pump 16 are constructed in a unit in a compact manner.

In operation, as the internal combustion engine 1 starts to cause the crankshaft 6 to rotate, the pulsating pressure in the crank chamber of the crankcase 4 is delivered to the pulsating pressure chamber 46 so that the pump diaphragm 45 deflects in one and the other direction in a vibratory manner so as to suck the lubricating oil through the inlet passage 48 via the check valve into the pump chamber 47 and to forcibly discharge the lubricating oil from the pump chamber 47 into the lubricating oil discharge port 52 through the discharge passage 51 past the check valve. In consequence, the lubricating oil is atomized from the lubricating oil discharge port 52 into the venturi tube 9 so as to be mixed into the air and the gas flowing through the venturi tube 9, whereby a mixture of air, gas and lubricating oil is formed. The thus formed mixture is then introduced into the internal combustion engine 1.

A glow plug 56 as igniting means is mounted on the head of the cylinder 2 of the internal combustion engine 1 so as to project into the combustion chamber. When the internal combustion engine 1 is to be started, a red-hot coil of the glow plug 56 is electrically connected to a suitable power supply (not shown) so as to ignite the mixture in the combustion chamber. When the internal combustion engine has a large compression ratio e which is, for example, greater than 11 ($\epsilon > 11$), the mixture in the combustion chamber can safely be ignited only by the heat of the red-hot coil thereof, even if the supply of the electrical power to the red-hot coil of the glow plug 56 is terminated.

Thus, according to the invention, there is provided a 2-cycle internal combustion engine which operates with a gas fuel such as a liquefied gas and which incorporates a glow plug capable of igniting the mixture in the combustion chamber. When the engine is to be started, electrical power is supplied to the red-hot coil of the glow plug so as to facilitate the ignition, thus smoothing the start-up of the engine. In consequence, magneto and other associated devices which heretofore have been necessary in this type of engine are eliminated, thus contributing to reduction in the weight and cost of the engine.

What is claimed is:

1. An internal combustion engine capable of operating with a gas fuel such as a liquefied gas, comprising: an intake port communicated with a venturitube so as to be able to supply a mixture of air and fuel mixed in said venturitube into a crank chamber in a crankcase of said engine so as to be precompressed; and a glow plug as igniting means mounted on the cylinder of said engine so as to be exposed into a combustion chamber in said engine, capable of igniting said precompressed mixture introduced into said combustion chamber from said crank chamber when electrically heated to a red-heat condition, and further capable of maintaining said red-heat condition by heat generated as a result of combustion in the combustion chamber.

2. A 2-cycle internal combustion engine according to claim 1, wherein the compression ratio $\epsilon$ of said internal combustion engine is greater than 11 ($\epsilon > 11$).

3. The apparatus of claim 1, wherein said fuel is ignited by said glow plug even if the supply of electrical energy is terminated.

4. The apparatus of claim 1, wherein said mixture is ignited only by the heat of said glow plug.

5. The apparatus of claim 3, wherein said mixture is ignited only by the heat of said glow plug.

* * * * *